(12) United States Patent
Downey

(10) Patent No.: US 7,677,593 B2
(45) Date of Patent: Mar. 16, 2010

(54) SIDE AIRBAG CURTAIN DIRECTIONAL DEPLOYMENT BRACKET

(75) Inventor: Brian Downey, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 287 days.

(21) Appl. No.: 11/676,088

(22) Filed: Feb. 16, 2007

(65) Prior Publication Data

US 2008/0197610 A1    Aug. 21, 2008

(51) Int. Cl.
*B60R 21/021* (2006.01)
(52) U.S. Cl. ............... 280/728.2; 280/730.2
(58) Field of Classification Search .......... 280/730.2, 280/728.2, 728.3
See application file for complete search history.

(56) References Cited

U.S. PATENT DOCUMENTS

| | | | |
|---|---|---|---|
| 5,681,055 A | 10/1997 | Green et al. | |
| 6,079,732 A | 6/2000 | Nakajima et al. | |
| 6,082,761 A * | 7/2000 | Kato et al. | 280/730.2 |
| 6,103,984 A | 8/2000 | Bowers et al. | |
| 6,179,324 B1 | 1/2001 | White, Jr. et al. | |
| 6,220,623 B1 | 4/2001 | Yokota | |
| 6,302,434 B2 | 10/2001 | Nakajima et al. | |
| 6,592,143 B2 | 7/2003 | Takahashi et al. | |
| 6,664,470 B2 | 12/2003 | Nagamoto | |
| 6,793,241 B2 * | 9/2004 | Wallner et al. | 280/730.2 |
| 6,863,300 B2 | 3/2005 | Ryu | |
| 7,059,629 B2 | 6/2006 | Takahara | |
| 2004/0239081 A1 * | 12/2004 | Tredez | 280/728.2 |
| 2005/0011057 A1 * | 1/2005 | Dominssini | 24/570 |

FOREIGN PATENT DOCUMENTS

FR    2784637 A1 *    4/2000

* cited by examiner

*Primary Examiner*—Paul N. Dickson
*Assistant Examiner*—Timothy Wilhelm
(74) *Attorney, Agent, or Firm*—Young Basile

(57) ABSTRACT

An inflatable passenger protection system for a vehicle having a structural front pillar frame member to be covered by a separate interior trim component, and a side curtain airbag to be positioned in a stowed condition between the front pillar frame member and the interior trim component, the interior trim component having at least a portion movable between a covered position enclosing the side curtain airbag in the stowed condition and an opened position in response to inflation of the side curtain airbag to the deployed condition, includes an extruded support bracket extending between the front pillar frame member and the interior trim component. The bracket has a primary attachment point and a secondary attachment point for supporting the interior trim component.

22 Claims, 4 Drawing Sheets

SIDE AIRBAG CURTAIN DIRECTIONAL DEPLOYMENT BRACKET

FIELD OF THE INVENTION

The present invention relates to an inflatable passenger restraint, confinement or attachment including a bag designed to inflate in response to impact of a vehicle with an external object and thereby confine a vehicle occupant to a protected environment made up of a confinement bag and a vehicle seat, where the confinement when inflated is positioned relative to an occupant, and wherein the inflatable confinement is stored during non-use in an uninflated condition within the vehicle at a side of an occupant.

BACKGROUND OF THE INVENTION

Various types of inflatable passenger constraint devices are known from U.S. Pat. No. 7,059,629; U.S. Pat. No. 6,863,300; U.S. Pat. No. 6,664,470; U.S. Pat. No. 6,592,143; U.S. Pat. No. 6,302,434; U.S. Pat. No. 6,220,623; U.S. Pat. No. 6,179,324; U.S. Pat. No. 6,103,984; U.S. Pat. No. 6,079,732; and U.S. Pat. No. 5,681,055. While each of these devices appears suitable for its intended purpose, it would be desirable to provide an apparatus for an inflatable passenger protection system of a vehicle with a support bracket extending between a front pillar frame member and an interior trim component, where the bracket includes a primary attachment point and a secondary attachment point for supporting the interior trim component.

SUMMARY OF THE INVENTION

An apparatus for an inflatable passenger protection system of a vehicle having a front pillar frame member to be covered by an interior trim component includes a side curtain airbag to be positioned in a stowed condition between the front pillar frame member and the interior trim component. The interior trim component has at least a portion moveable between a covered position enclosing the side curtain airbag in a stowed condition and an opened position in response to inflation of the side curtain airbag to a deployed condition. The apparatus includes an extruded support bracket extending between the front pillar frame member and the interior trim component. The extruded support bracket has a primary attachment point and a secondary attachment point for supporting the interior trim component.

An inflatable passenger protection system includes an airbag to be stored in a folded state along a pillar portion of a vehicle body and a roof side rail. The airbag is designed to be inflated into the shape of a curtain in a lateral region of the passenger compartment by being supplied with gas from an inflator. An energy-absorbing support bracket member is located extending in an longitudinal direction of the pillar portion and extending between the pillar portion and an interior trim component for covering the pillar portion in such a manner as to define a hollow passage where the airbag is stored in a folded state between the pillar portion and the interior trim portion. The pillar portion can be an A-pillar or a C-pillar. A guide surface for guiding the airbag during deployment of the airbag is formed on one lateral surface of the energy-absorbing support bracket member. The portion of the airbag stored in a folded state in the pillar portion is located substantially parallel to the guide surface. An interior trim component is supported from the energy-absorbing support bracket member and has at least a portion moveable between a closed position covering the folded airbag and an opened position in response to forces applied to a backside surface of the interior trim component during inflation of the airbag to a deployed condition.

A method of mounting an inflatable passenger protection system is disclosed in which an airbag is designed to be inflated into the shape of a curtain in a lateral region of a passenger compartment by being supplied with gas from an inflator. The airbag is stored in a folded state along a pillar portion of a vehicle body. At least one hollow energy-absorbing support bracket member is supported from a pillar portion of the vehicle body and located extending along a longitudinal direction of the pillar portion. The airbag is fitted to the vehicle body after the at least one energy-absorbing support bracket member has been supported from the vehicle body. A portion of the airbag is stored in a folded state in the pillar portion. An interior trim component is supported from the hollow energy-absorbing support bracket.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
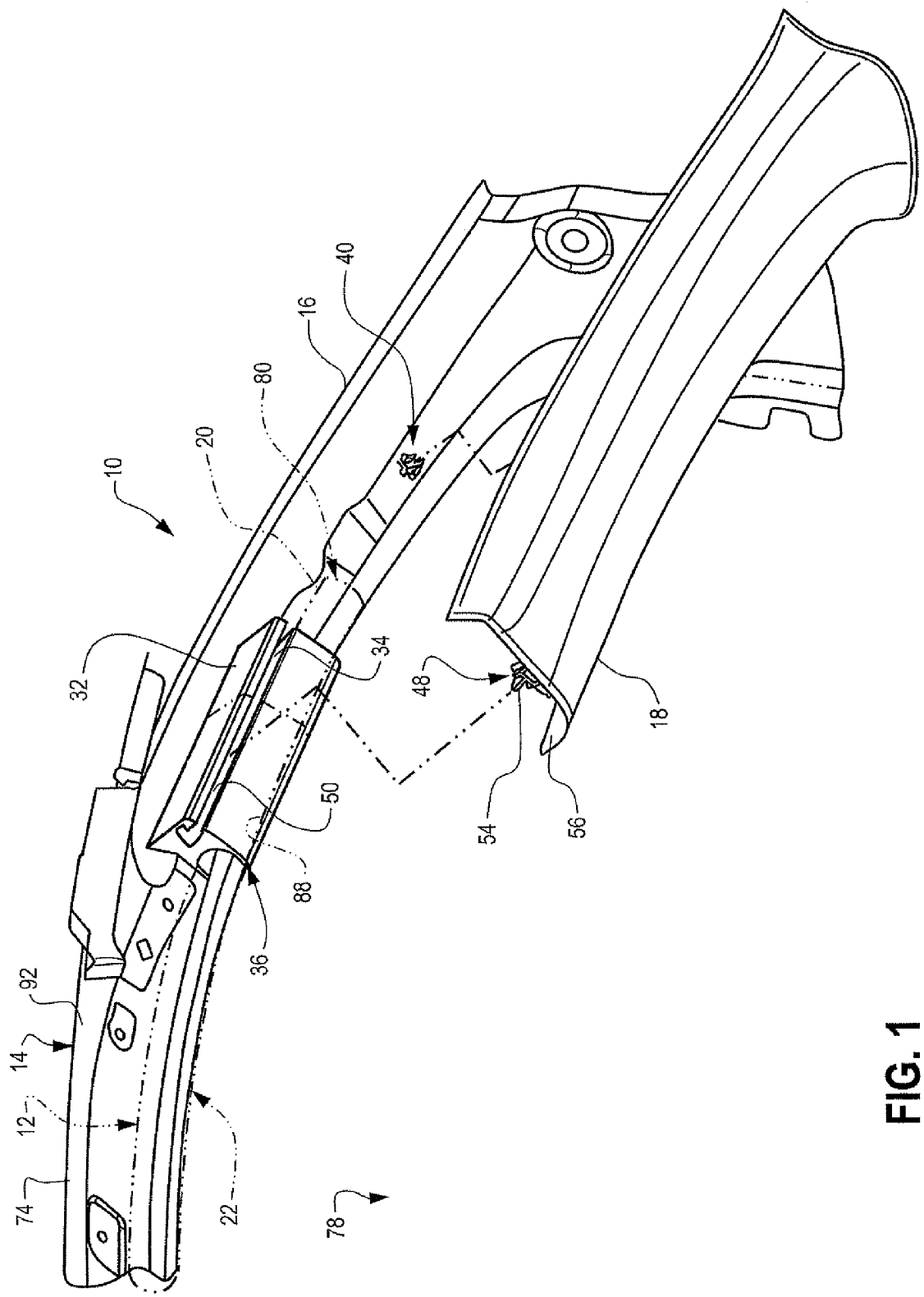
FIG. 1 is an exploded, perspective view illustrating a pillar frame member, an interior trim component, and a support bracket extending between the front pillar frame member and the interior trim component.
Figure 2:
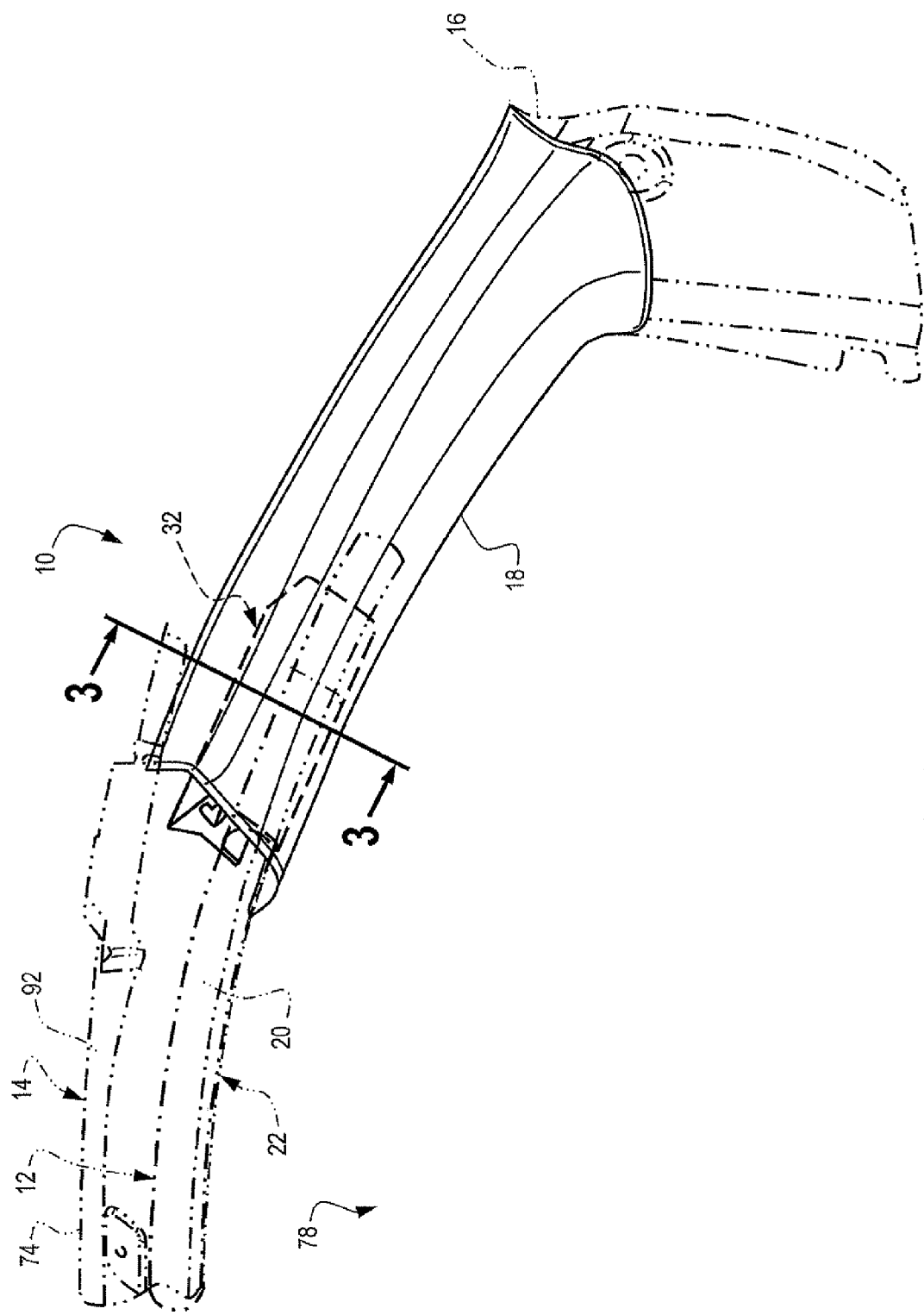
FIG. 2 is an assembled view of the interior trim component supported by the support bracket, where the support bracket is connected to the pillar frame member.
Figure 3:
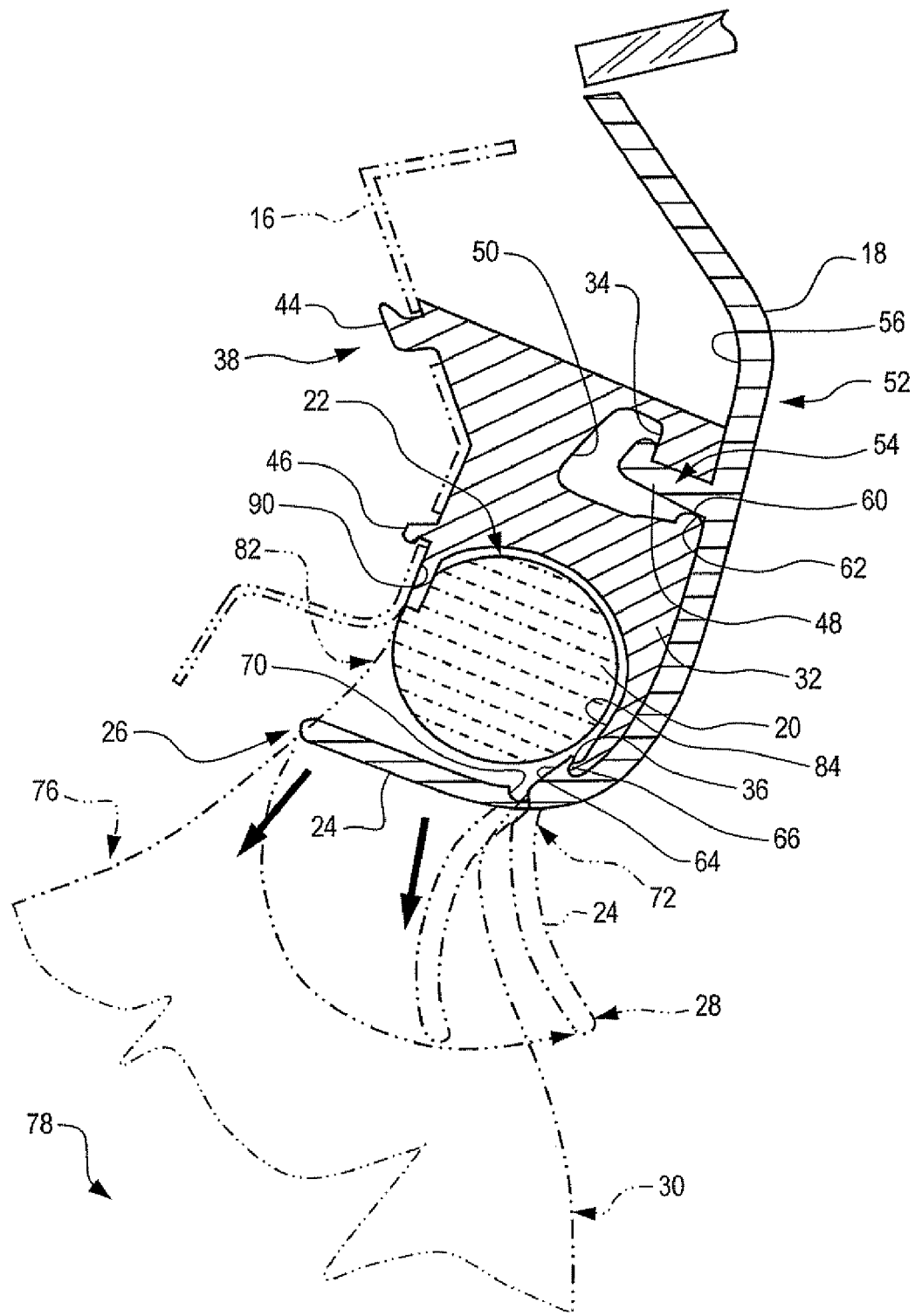
FIG. 3 is a cross-sectional view of the assembled support bracket to the pillar frame member and the attached interior trim component taken as shown in FIG. 2.
Figure 4:
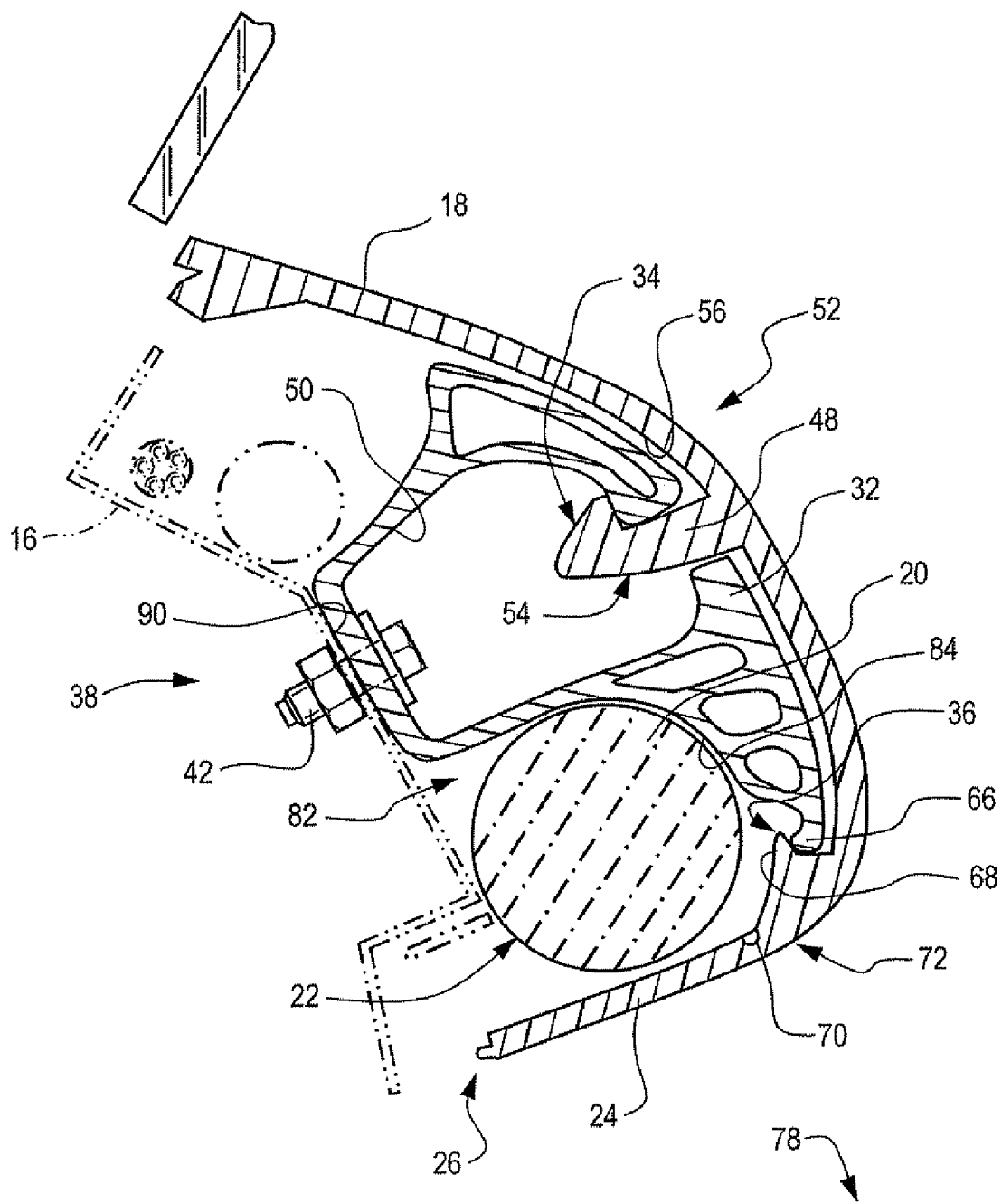
FIG. 4 is a cross-sectional view of a support bracket connected to a pillar frame member and supporting an interior trim component, while having a slightly different cross-sectional configuration from that illustrated in FIG. 3.

Referring now to FIGS. 1-3, an apparatus 10 is provided for an inflatable passenger protection system 12 of a vehicle 14. The vehicle 14 includes a front pillar frame member 16 to be covered by an interior trim component 18. A side curtain airbag 20 can be positioned in a stowed condition 22 between the front pillar frame member 16 and the interior trim component 18. The interior trim component 18 has at least a portion 24 moveable between a covered position 26, best seen in solid line in FIG. 3 enclosing the side curtain airbag 20 in the stowed or folded condition 22 and an opened position 28 (as seen in phantom line in FIG. 3) in response to inflation of the side curtain airbag 20 to a deployed condition 30. The apparatus 10 includes an extruded support bracket 32 extending between the front pillar frame member 16 and the interior trim component 18. The bracket 32 includes a primary attachment point 34 and a secondary attachment point 36 for supporting the interior trim component 18.

The bracket 32 is connectible to the front pillar frame 16. A attachment device 38 can be provided for attaching the bracket 32 to the front pillar frame 16. The attachment device 38 can include a mechanical fastener 40 connecting the bracket to the pillar frame 16 selected from a group of fasteners consisting of a bolt 42, a screw, a clip, a hook 44, a tab, a leverage finger 46, an interference fit fastener, a push on interference washer, and any combination thereof.

The primary attachment point 34 between the bracket 32 and the interior trim component 18 can include a primary attachment member 48 and complementary retention chamber 50 combination formed in an interface between the bracket 32 and the interior trim component 18 to connect the trim component 18 to the bracket 32. The retention chamber 50 is formed sufficiently large to allow installing movement of the interior trim component 18 between an insertion position to an installed position 52. The primary attachment member 48 and complementary retention chamber 50 combination can include the trim component 18 having a generally L-shaped attachment hook 54 extending outwardly from a backside 56 of the trim component 18 to be received within a complementary generally L-shaped chamber 50 formed in the bracket 32. The generally L-shaped chamber 50 can include a lip 60 adjacent an outer peripheral edge 62 of the chamber 50 allowing installing movement of the trim component 18 through a predetermined angular arc between the insertion position and the installed position 52.

The secondary attachment point 36 can include a secondary attachment member 64 and complementary notch 66 combination formed on the bracket 32 and the interior trim component 18 to connect the trim component to the bracket 32. The trim component 18 can include the secondary attachment member 64 extending outwardly from a backside 56 of the trim component 18 to be engaged by the complementary notch 66 formed on the support bracket 32. A hinge 70 can be formed in a backside 56 of the trim component 18 adjacent the attachment member 64 to define a pivot 72 for the portion 24 of the trim component 18 in order to allow movement between the closed or covered position 26 and the opened position 28.

An inflatable passenger protection system 12 includes an airbag 20 to be stored in a folded state 22 along a pillar portion 16 of a vehicle body 14 and a roof side rail 74. The airbag 20 being designed to be inflated into the shape of a curtain 76 in a lateral region of a passenger compartment 78 by being supplied with gas from an inflator 80. An energy-absorbing support bracket member 32 can be located extending in a longitudinal direction of the pillar portion 16 and extending between the pillar portion 16 and an interior trim component 18 for covering the pillar portion 16 in such a manner as to define a hollow passage 82 where the airbag 20 is stored in a folded state 22 between the pillar portion 16 and the interior trim component 18. The pillar portion 16 can be an A-pillar or a C-pillar. A guide surface 84 for guiding the airbag 20 during deployment of the airbag 20 can be formed on one lateral surface of the energy-absorbing support bracket member 32. The portion of the airbag 20 stored in a folded state 22 in the pillar portion 16 can be located substantially parallel to the guide surface 84. An interior trim component 18 is supported from the energy-absorbing support bracket member 32 and includes at least a portion 24 moveable between a closed position 26 covering the folded airbag 20 and an opened position 28 in response to forces applied to a backside surface 56 of the interior trim component 18 during inflation of the airbag 20 to a deployed condition 30. The portion 88 of the airbag 20 stored in a folded state 22 in the pillar portion 16 can be located in such a direction so as to intersect with the guide surface 84. The portion 88 of the airbag 20 stored in a folded state 22 in the pillar portion 16 can be located apart from the guide surface 84. The portion 88 of the airbag 20 stored in a folded state 22 in the pillar portion 16 can be located in contact with the guide surface 84. The energy-absorbing support bracket member 32 can be a solid or a hollow member made from an extrudable metal, such as aluminum, or can be a solid or a hollow member made from an extrudable plastic.

A method of mounting an inflatable passenger protection system 12 in which an airbag 20 is designed to be inflated into the shape of a curtain 76 in a lateral region of a passenger compartment 78 by being supplied with gas from an inflator 80 is stored in a folded state 22 along a pillar portion 60 of a vehicle body 14, includes supporting at least one hollow energy-absorbing support bracket member 32 to be located extending along a longitudinal direction of the pillar portion 16 of the vehicle body 14. The airbag 20 is fitted to the vehicle body 14 after the at least one energy-absorbing support bracket member 32 has been supported from the vehicle body 14. A portion 88 of the airbag 20 is stored in a folded state 22 in the pillar portion 16. An interior trim component 18 is supported from the hollow energy-absorbing support bracket 32. The hollow energy-absorbing support bracket member 32 can be located on a portion of the roof side rail above an upper end portion of a B-pillar garnish. The energy-absorbing support bracket member 32 can be provided with a guide surface 84 for ensuring deployment of the airbag 20 into the passenger compartment 78. The guide surface 84 can be inclined with respect to a body-side mounting surface 90 of the energy-absorbing support bracket member 32. The step of fitting the at least one hollow energy-absorbing support bracket member 32 along the longitudinal direction of the pillar portion 16 of the vehicle body 14 can include fitting at least one of the hollow energy-absorbing support bracket members 32 on a portion 92 of a roof side rail 74 above an upper end portion of a B-pillar garnish. The energy-absorbing support bracket member 32 can be provided with a guide surface 84 for ensuring deployment of the airbag 20 into the passenger compartment 78. The guide surface 84 can be inclined with respect to a body-side mounting surface 90 of the energy-absorbing support bracket member 32.

During assembly, the support bracket member 32 is connected to the pillar frame member 16. The airbag 20 is then positioned in a stowed folded condition 22 between the pillar frame member 16 and the support bracket 32. An interior trim component 18 is then connected and supported from the support bracket 32 using primary attachment points and secondary attachment points associated with the support bracket 32.

According to an embodiment of the invention, a support bracket is provided for allowing an inflatable curtain to deploy outward from inside of a front pillar trim during a side impact event. The support bracket can be formed as desired based on the styling of the front pillar trim and the body surface. The support bracket can be created simply through a ram-extrusion mold with the material being either aluminum or plastic depending on the requirements of the head impact target area and deployment characteristics of the curtain. The extrusion mold according to an embodiment of the present invention can be designed and made to the dimensional characteristics allowed between the front pillar trim and the body shape metal. This configuration would be beneficial to the original equipment manufacturers at this time who may desire to add to an existing side airbag curtain coverage, or create a side airbag curtain that would need to be package or retrofitted in the front pillar trim area. An extruded support bracket, according to an embodiment of the present invention, can be tuned for obtaining acceptable values for a head impact event at the front pillar trim. The extruded support bracket can be formed either as part of the side curtain airbag assembly or as a separate piece. Using a secondary operation, the extruded support bracket can be further machined in any desired fashion, such as in order to remove material for a fastener feature, or coring out clearance or weight reducing apertures.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In an inflatable passenger protection system for a vehicle having a structural front pillar frame member to be covered by a separate interior trim component, and a side curtain airbag to be positioned in a stowed condition between the front pillar frame member and an inner surface of the interior trim component, the interior trim component having at least a portion movable between a covered position enclosing the side curtain airbag in the stowed condition and an opened position in response to inflation of the side curtain airbag to the deployed condition, the improvement comprising:

an extruded support bracket having an inner surface engageable with the front pillar frame member, a guide surface that extends outward from the inner surface to an outer surface that is spaced from the inner surface and the front pillar member and is engageable with the interior trim component, the bracket having a primary attachment point formed on the outer surface thereof and a secondary attachment point formed on the outer surface thereof for supporting the interior trim component, and the outer surface of the bracket being substantially continuous and in continuous contact with the inner surface of the interior trim component between the primary attachment point and the secondary attachment point.

2. The improvement of claim 1, wherein the primary attachment point further comprises:

a primary attachment member and complementary retention chamber combination formed in the bracket and the interior trim component to connect the trim component to the bracket, the retention chamber being sufficiently large to allow installing movement of the interior trim component between an insertion position to an installed position.

3. The improvement of claim 2, wherein the primary attachment point further comprises:

the trim component having a generally L-shaped attachment hook extending outwardly from a backside of the trim component to be received within a complementary generally L-shaped chamber formed in the bracket.

4. The improvement of claim 3, wherein the generally L-shaped chamber includes a lip adjacent an outer peripheral edge of the chamber allowing installing movement of the trim component through a predetermined angular arc between the insertion position and the installed position.

5. The improvement of claim 1, wherein the secondary attachment point further comprises:

a secondary attachment member and complementary notch combination formed on the bracket and the interior trim component to connect the trim component to the bracket.

6. The improvement of claim 5, wherein the secondary attachment member is defined as a projection that engages the complementary notch which is partially defined by a lip extending outwardly from a backside of the trim component.

7. The improvement of claim 6 further comprising:

a hinge portion formed in a backside of the trim component adjacent the lip of the trim component defining a pivot for the at least one portion of the trim component for movement between the closed position and the opened position.

8. The improvement of claim 1, further comprising:

a hinge portion formed on the trim component adjacent to the secondary attachment point of the extruded support bracket for movement of the interior trim component between the covered position and the opened position.

9. An inflatable passenger protection system comprising:

an airbag to be stored in a folded state along a pillar portion of a vehicle body and a roof side rail, the airbag designed to be inflated into the shape of a curtain in a lateral region of a passenger compartment by being supplied with gas from an inflator;

an energy-absorbing support bracket member rigidly connected to the pillar Portion, located extending in a longitudinal direction of the pillar portion and extending between the pillar portion and an interior trim component for covering the pillar portion in such a manner as to define a hollow passage where the airbag is stored in a folded state between the pillar portion and the interior trim component, wherein the pillar portion is an A-pillar or a C-pillar, the energy absorbing support bracket member having an outside surface opposite the pillar portion;

an interior trim component supported from the outside surface of the energy-absorbing support bracket member and having at least a portion moveable between a closed position covering the folded airbag and an opened position in response to forces applied to a backside surface of the interior trim component during inflation of the airbag to a deployed condition;

a substantially arcuate guide surface adjacent to the hollow passage for guiding the airbag during deployment of the airbag being formed on one lateral surface of the energy-absorbing support bracket member, the guide surface having at least a first portion that faces the moveable portion of the interior trim component to direct the airbag toward the moveable portion of the interior trim component and a second portion opposite the outside surface to prevent engagement of the airbag with the interior trim panel adjacent to the outside surface of the energy absorbing bracket member, wherein the portion of the airbag stored in a folded state in the pillar portion is disposed substantially parallel to the guide surface.

10. The inflatable passenger protection system of claim 9, wherein the portion of the airbag stowed in the pillar portion is disposed in such a direction as to correspond with the guide surface.

11. The inflatable passenger protection system of claim 9, wherein the portion of the airbag stored in a folded state in the pillar portion is disposed apart from the guide surface.

12. The inflatable passenger protection system of claim 9, wherein the portion of the airbag stored in a folded state in the pillar portion is disposed in contact with the guide surface.

13. The inflatable passenger protection system of claim 9, wherein the guide surface is inclined with respect to a body-side mounting surface of the energy-absorbing support bracket member.

14. The inflatable passenger protection system of claim 9, wherein the energy-absorbing support bracket member is a hollow member made from an extrudable metal or a hollow member made from extrudable plastic.

15. The inflatable passenger protection system of claim 9, wherein the substantially arcuate guide surface extends from a first point adjacent to the pillar portion and a second point adjacent to the interior trim component.

16. An inflatable passenger protection system for a vehicle, comprising:

a structural pillar frame member;

a side curtain airbag having a stowed condition and a deployed condition;

an interior trim component having a hinge portion and a supporting portion, the hinge portion defined between a first lateral edge of the interior trim component and an elongate lateral hinge point and movable between a covered position enclosing the side curtain airbag in the stowed condition and an opened position in response to inflation of the side curtain airbag to the deployed condition, the supporting portion disposed between the elongate lateral hinge point and a second lateral edge of the interior trim component;

a primary attachment member formed on the supporting portion of the interior trim component adjacent to the second lateral edge of the interior trim component;

a secondary attachment member formed on the supporting portion adjacent to the elongate lateral hinge point; and a support bracket extending between the front pillar frame member and the interior trim component, the bracket having a primary attachment point engageable with the primary attachment member of the interior trim component and a secondary attachment point engageable with the secondary attachment member of the interior trim component.

17. The inflatable passenger protection system of claim 16, further comprising:

A guide surface for guiding the side curtain airbag during deployment of the side curtain airbag being formed on one lateral surface of the support bracket, wherein the guide surface directs the side curtain airbag into engagement with the hinge portion of the interior trim component during deployment of the side curtain airbag.

18. The inflatable passenger protection system of claim 17, wherein the guide surface restrains the side curtain airbag from engaging the supporting portion of the interior trim component between the primary attachment member and the secondary attachment member during deployment of the side curtain airbag.

19. The inflatable passenger protection system of claim 18, wherein the structural pillar is an A-pillar.

20. The inflatable passenger protection system of claim 16, further comprising:

the primary attachment point of the support bracket having an elongate chamber formed in the bracket; and the primary attachment member of the interior trim component having an elongate flange extending integrally outward from a backside of the interior trim component to be received within the elongate chamber of the support bracket.

21. The inflatable passenger protection system of claim 16, further comprising:

the secondary attachment member of the interior trim component having an elongate notch formed integrally on a backside of the interior trim component; and the secondary attachment point of the support bracket having an elongate projection formed on the bracket that engages the elongate notch of the trim component.

22. The inflatable passenger protection system of claim 16, further comprising:

the guide surface having a first lateral edge adjacent to the structural pillar, a second lateral edge adjacent to the interior trim component, and a substantially arcuate portion that extends between the first and second lateral edges, wherein the substantially arcuate portion partially encircles the airbag in the stowed condition.

* * * * *